United States Patent
Cowen et al.

(10) Patent No.: US 9,922,734 B2
(45) Date of Patent: Mar. 20, 2018

(54) CONTAINMENT VENT SYSTEM WITH PASSIVE MODE FOR BOILING WATER REACTORS (BWRS), AND METHOD THEREOF

(71) Applicants: Robert Henry Cowen, Wilmington, NC (US); Edward Andersen, Wilmington, NC (US); Jose Maria Caro, Wilimington, NC (US); Necdet Kurul, Wilmington, NC (US); Michael James Barbaretta, Wilmington, NC (US); Phillip Glen Ellison, Wilmington, NC (US)

(72) Inventors: Robert Henry Cowen, Wilmington, NC (US); Edward Andersen, Wilmington, NC (US); Jose Maria Caro, Wilimington, NC (US); Necdet Kurul, Wilmington, NC (US); Michael James Barbaretta, Wilmington, NC (US); Phillip Glen Ellison, Wilmington, NC (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 572 days.

(21) Appl. No.: 13/729,565

(22) Filed: Dec. 28, 2012

(65) Prior Publication Data
US 2014/0185729 A1    Jul. 3, 2014

(51) Int. Cl.
*G21C 9/008*    (2006.01)
*G21C 13/02*    (2006.01)
(Continued)

(52) U.S. Cl.
CPC ............ *G21C 9/008* (2013.01); *G21C 13/022* (2013.01); *G21D 1/02* (2013.01); *G21F 9/02* (2013.01); *Y02E 30/31* (2013.01)

(58) Field of Classification Search
CPC ...... G21C 9/004; G21C 9/008; G21C 13/022; G21C 13/10; G21C 9/024
(Continued)

(56) References Cited

U.S. PATENT DOCUMENTS 3,423,286 A * 1/1969 Hinds .................. G21C 1/32
376/284
4,213,824 A * 7/1980 Jabsen .................. G21C 9/012
376/283
(Continued)

FOREIGN PATENT DOCUMENTS

JP    H04-50798 A    2/1992
JP    H04-344495 A   12/1992
JP    2012 230058 A  11/2012

OTHER PUBLICATIONS

Machine translation of JP 2012-2300058, Nov. 2012, Toshiba Corp.*

(Continued)

*Primary Examiner* — Sharon M Davis
(74) *Attorney, Agent, or Firm* — Harness, Dickey & Pierce

(57) ABSTRACT

A system and a method for a passive containment vent system for a Boiling Water Reactor (BWR). The system is capable of venting and scrubbing a gaseous discharge from the primary containment of the BWR over a prolonged period of time leading up to or following a serious plant accident, without the need for monitoring by on-site plant personnel. External electrical power is not required (following initial activation of the system) in order to operate the containment vent system. The system may protect the integ-
(Continued)

rity of primary containment during and following the serious plant accident.

19 Claims, 6 Drawing Sheets

(51) Int. Cl.
*G21D 1/02* (2006.01)
*G21F 9/02* (2006.01)

(58) Field of Classification Search
USPC .......................................................... 376/283
See application file for complete search history.

(56) References Cited

U.S. PATENT DOCUMENTS

| | | | |
|---|---|---|---|
| 4,816,210 A | 3/1989 | Henry | |
| 4,927,596 A | 5/1990 | Minnick | |
| 5,223,209 A | 6/1993 | Eckardt | |
| 5,227,127 A | 7/1993 | Sato | |
| 5,596,613 A | 1/1997 | Gluntz | |
| 5,872,825 A | 2/1999 | Eckardt | |
| 2006/0188055 A1* | 8/2006 | Eckardt | B01D 47/10 376/283 |
| 2010/0092252 A1* | 4/2010 | Force et al. | 406/28 |
| 2014/0010340 A1 | 1/2014 | Nilsson | |

OTHER PUBLICATIONS

PCT Search Report issued in connection with corresponding WO Patent Application No. US2013/077390 dated May 12, 2014.
Machine translation and Notification of Reasons for Refusal issued in connection with corresponding JP Application No. 2015-550712 dated Oct. 10, 2017.

* cited by examiner

CONTAINMENT VENT SYSTEM WITH PASSIVE MODE FOR BOILING WATER REACTORS (BWRS), AND METHOD THEREOF

BACKGROUND OF THE INVENTION

Field of the Invention

Example embodiments relate generally to nuclear Boiling Water Reactors (BWRs), and more particularly to a system and a method for a containment vent system. The system may be passive, such that the system may be operated for extended period without the need for monitoring by on-site plant personnel or the application of external electrical power following initial activation of the system. The system may protect the integrity of primary containment during a serious plant accident.

Related Art

During a nuclear power accident, nuclear boiling water reactors (BWRs) predominantly rely on a primary containment structure 1 (see FIG. 1) to prevent radioactive materials (gases, liquids and particulates) from being released into the surrounding environment. However, in modern history, three severe nuclear accidents (Chernobyl, Three Mile Island, and Fukushima) have involved a release of radioactive materials from primary containment structures of a nuclear plant.

Conventionally, a venting system 10 connected to the wetwell 4 (the space between the drywell 8 and the suppression pool 6 of a BWR) of a BWR reactor 2 may also be used to release vapor from the reactor 2 to relieve pressure during a serious plant accident (such as a partial meltdown, or a complete meltdown of the reactor core). The conventional venting system 10 often includes a wetwell vent line 12 with inner and outer containment isolation valves (CIVs) 3a/3b used to vent vapor from the wetwell 4 directly to the atmosphere during periods when over-pressurization of primary containment 1 may cause structural damage that could escalate a release of radioactive material into the environment. However, the conventional venting system 10 may be inadequate in truly assisting plant personnel as the system 10 generally requires continuous on-site monitoring (during a time when multiple high priority demands may exist). For instance, a conventional venting system 10 requires the opening and closing of the inner and outer containment isolation valves (CIVs) 3a/3b (which act to discharge vapor from the wetwell 4) by on-site plant personnel that are necessarily required to react as plant conditions change during a serious plant accident.

SUMMARY OF INVENTION

Example embodiments provide a system and a method for a containment vent system for a nuclear boiling water reactor (BWR). The system may be passive such that it may perform the function of venting and scrubbing radioactive gaseous discharge from the primary containment of the reactor without the need for continuous containment pressure monitoring via on-site plant personnel (or the application of external electrical power following initial activation of the system into a passive mode). The system may be used to integrity of primary containment during serious plant accident.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
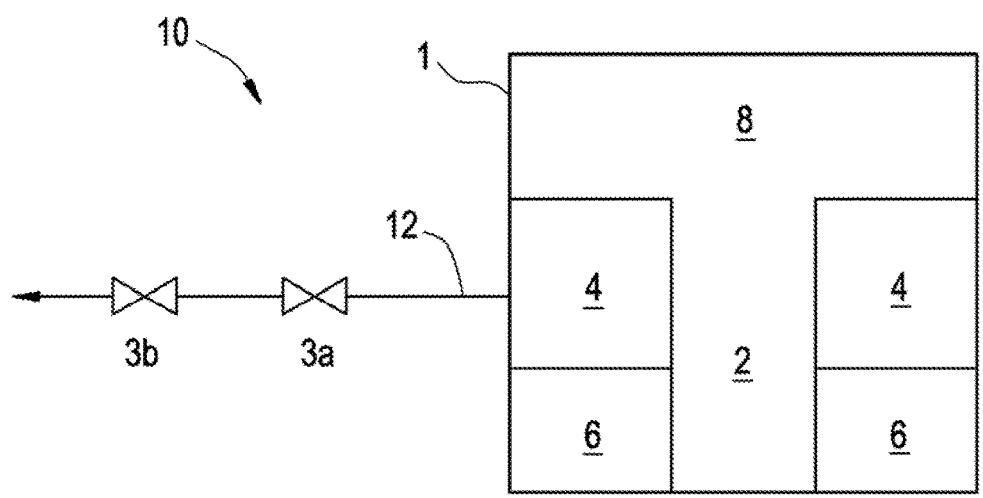
FIG. 1 is a diagram of a conventional venting system of a nuclear boing water reactor (BWR) wetwell.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
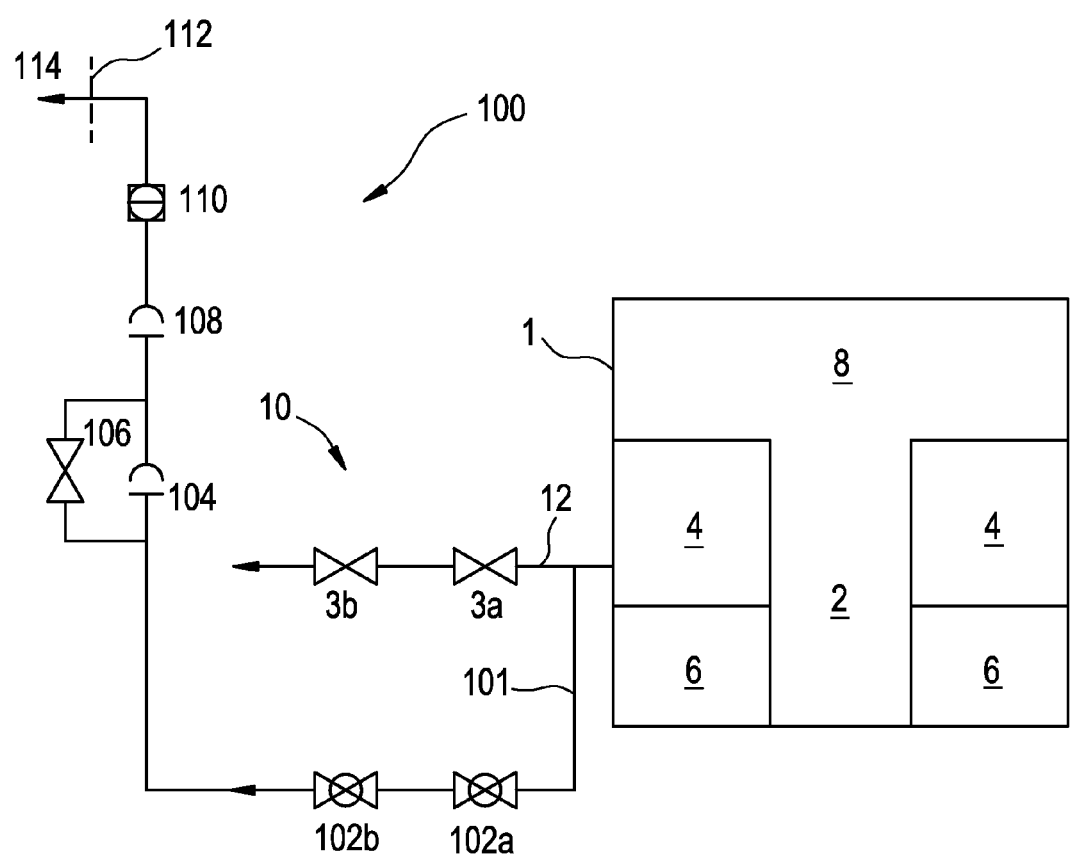
FIG. 2 is a diagram of a containment vent system, in accordance with an example embodiment.

FIG. 2 is a diagram of a containment vent system 100, in accordance with an example embodiment. The containment venting system 100 may include a containment vent line 101 that is fluidly connected to the wetwell 4 of a BWR reactor 2. Specifically, the containment vent line 101 may be connected to the existing wetwell vent line 12. More specifically, the containment vent line 101 may tie into the existing wetwell vent line 12 upstream of the inner CIV 3a.

Inner and outer containment valves 102a/ 102b may be included in the containment vent line 101. The containment valves 102a/ 102b may be ball valves (with air-actuators), butterfly valves (with air-actuators), butterfly valves (with motor-actuation), or other types of valves suitable for nuclear service. By opening the containment valves 102a/ 102b, plant personnel may activate the containment vent system 100 (placing system 100 in a "passive mode," especially in a post-accident scenario). The opening of the containment valves 102a/ 102b most likely would occur in a point in time when plant personnel realize that the progression of a serious plant accident may eventually require primary containment 1 venting (in order to prevent an unavoidable over-pressurization of the primary containment 1). Following the opening of the containment valves 102a/ 102b, the system 100 may passively function in a standby, self-regulating (i.e., passive) mode, without further plant personnel intervention, thereby assuring primary containment 1 integrity.

A high pressure set-point rupture disk 104 may also be included in the containment vent line 101, downstream of the inner/outer containment valves 102a/b. The high pressure set-point rupture disk 104 may have a rupture set pressure of the design pressure for primary containment 1, the primary containment pressure limit (PCPL), or another high set-pressure, commensurate with the specifics of the nuclear plant. The rupture set pressure may cause the disk 104 to automatically rupture at the set pressure. A bypass valve 106 may also be included in the containment vent line 101, in parallel with the high pressure set-point rupture disk 104. The bypass valve 106 may allow plant personnel to vent at pressures that are lower than the set-point pressure of the high pressure set-point rupture disk 104.

Downstream of the high pressure set-point rupture disk 104, a low pressure set-point rupture disk 108 may also be provided in the containment vent line 101. The low pressure set-point rupture disk 108 may have a rupture set pressure of about 3 psig (or, another low set-pressure that is lower than the high set-pressure of the high pressure set-point rupture disk 104, commensurate with the specifics of the nuclear plant), causing the disk 108 to automatically rupture at this pressure. The low pressure set-point rupture disk 108 may be provided simply to protect the system 100.

Downstream of the high pressure set-point rupture disk 104 and low set-point rupture disk 108, an optional radiation monitor 110 may be provided in the containment vent line 101. The radiation monitor 110 may provide remote indication to plant personnel that the containment vent system 100 is venting radioactive vapor. This information may be helpful to plant personnel remaining on-site during a serious accident.

The containment vent line 101 may be provided with a discharge point 114 that discharges at a remote location from primary containment 1. Preferably, the discharge point 114 may be elevated well above the ground and away from plant personnel. For instance, the containment vent line 101 may penetrate the reactor building roof 112 (or be routed elsewhere outside of the reactor building), providing a discharge point 114 for the system 100 that may exist outside of the reactor building (which houses the primary containment 1).

While FIG. 2 shows the containment vent line 101 connected to the wetwell vent line 12 (and therefore in fluid communication with the wetwell 4), it should be understood that the containment vent line 101 may alternatively be fluidly connected to the drywell 8 of primary containment 1 (and this optional embodiment applies to all of the following described drawings).

Figure 3:
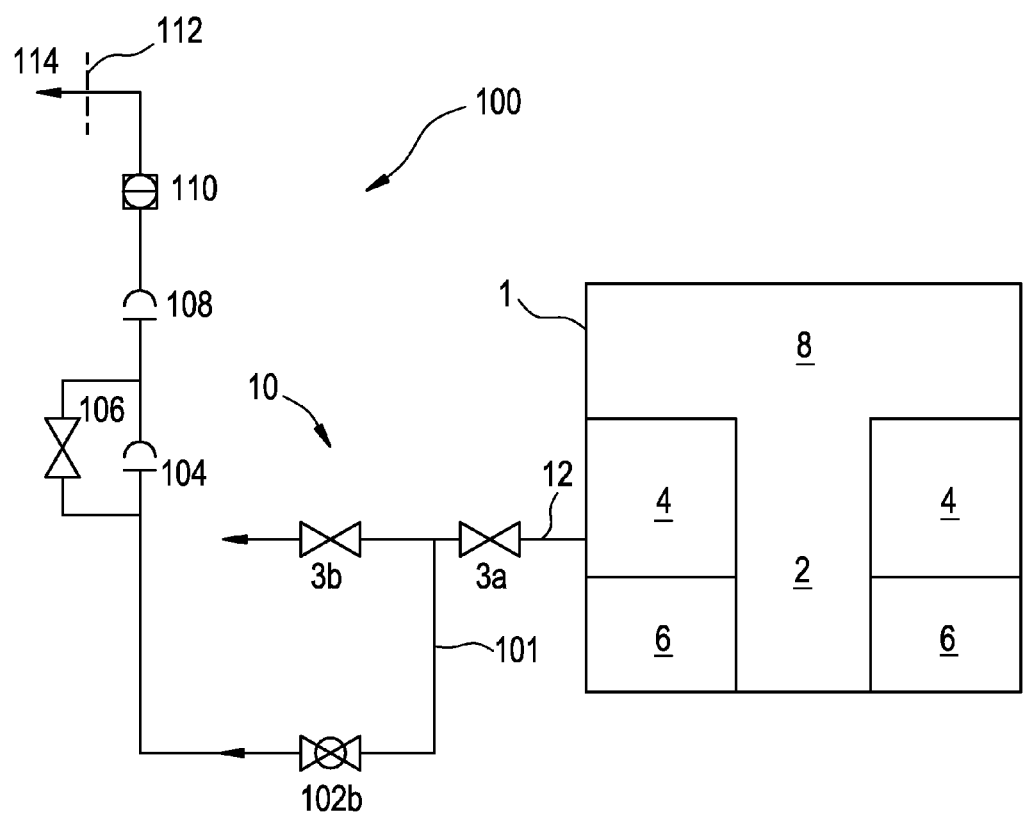
FIG. 3 is a diagram of another containment vent system, in accordance with an example embodiment.

FIG. 3 is a diagram of another containment vent system 100, in accordance with an example embodiment. The system 100 may be identical to the system 100 shown in FIG. 2, with the exception that the containment vent line 101 may tie into the existing wetwell vent line 12 in between the inner and outer CIVs 3a/3b. Because the containment vent line 101 connects to the existing wetwell vent line 12 downstream of the inner CIV 3a, only a single containment valve (outer containment valve 102b) is required to be included in the containment vent line 101.

It should also be noted that the containment vent line 101 may optionally tie into the wetwell vent line upstream of both the inner and outer CIVs 3a/3b (rather than between the inner and outer CIVs 3a/3b, as shown in FIG. 3). Using this optional configuration, the high pressure set-point rupture disk 104 may be set just above the primary containment 1 design pressure (by a small margin), such that once the system 100 is placed in a "passive mode" (by opening containment valve 102b), primary containment 1 will be protected from ultimate failure.

Figure 4:
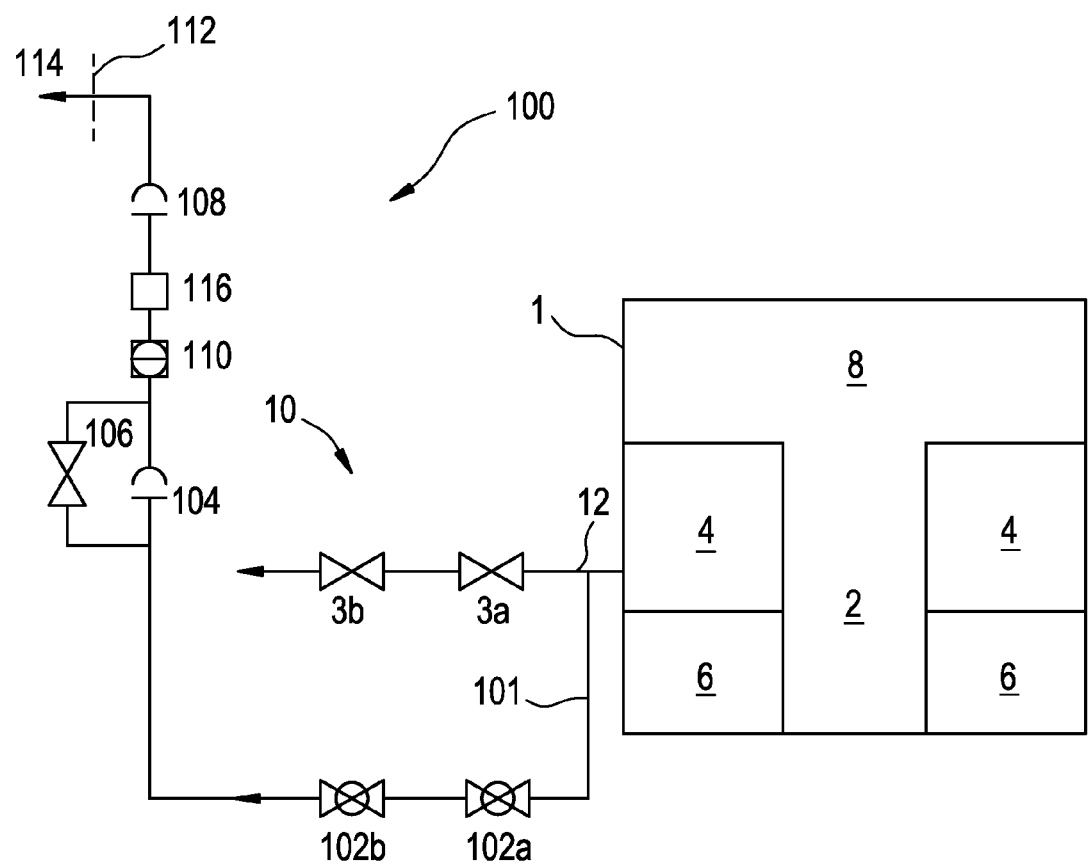
FIG. 4 is a diagram of another containment vent system, in accordance with an example embodiment.

FIG. 4 is a diagram of another containment vent system 100, in accordance with an example embodiment. Specifically, this embodiment may be a modification of any of the embodiments described above (though FIG. 4 is shown as a modification of FIG. 2, as one working example). The modification may include inclusion of a vent filter 116 (see FIG. 5, and the description below) upstream of the low pressure set-point rupture disk 108. Placement of the filter 116 upstream of the low pressure set-point rupture disk 108 allows the filter 116 to be included in any nitrogen blanket that may be used to passivize the system 100.

This modified embodiment may also include locating a radiation monitor 110 upstream of the optional filter 116 to ensure accurate monitoring of system 100 venting.

Figure 5:
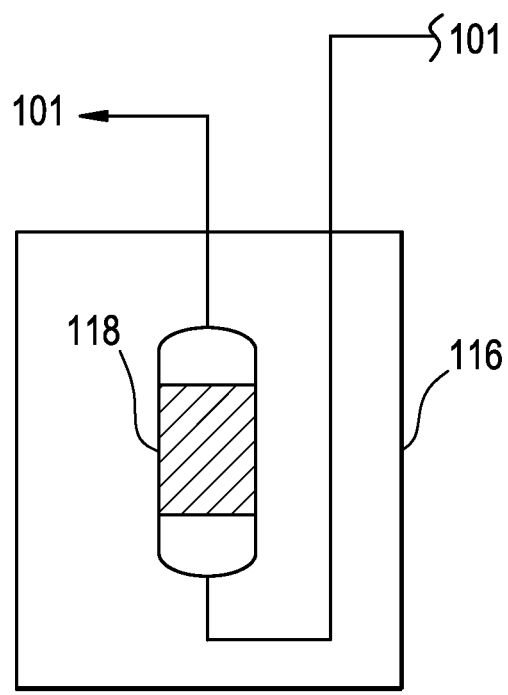
FIG. 5 is an optional vent filter, in accordance with an example embodiment.

FIG. 5 is an optional vent filter 116, in accordance with an example embodiment. The vent filter 116 may be included in the containment vent line 101 upstream of the low pressure set-point rupture disk 108 (see FIG. 4). The vent filter 116 may include a wet filter 118 that may be a tank partially filled with water and chemical additives that may scrub vapor being vented via the system 100. In particular, the chemical additives may be included in order to retain iodine and other harmful radioactive material entrained in the vented vapor. The wet filter 118 may include an optional moisture separator that may remove liquid included in the vapor discharge.

Figure 6:
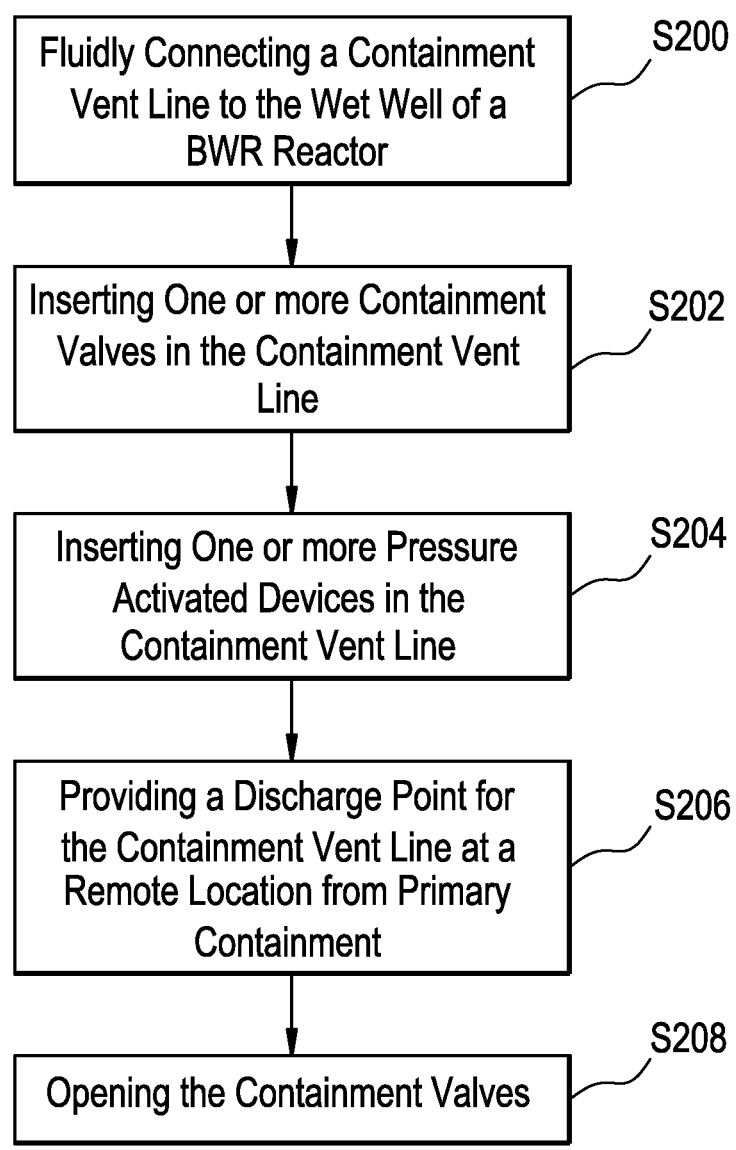
FIG. 6 is a flowchart of a method of making and using a containment vent system, in accordance with an example embodiment.

FIG. 6 is a flowchart of a method of making and using a containment vent system 100, in accordance with an example embodiment. The method may include a step S200 of fluidly connecting the containment vent line 101 to the wetwell 4 of a BWR reactor 2. As shown in FIGS. 2 and 3, this connection may occur by connecting the containment vent line 101 (which may be piping or tubing) to an existing wetwell vent line 12 upstream of the inner CIV 3a, or connecting the containment vent line 101 to the existing wetwell vent line 12 between the inner and outer CIVs 3a/3b. Step S202 may include inserting one or more containment valves 102a/102b in the containment vent line 101. Step S204 may include inserting one or more pressure activated devices (such as rupture disks 104/108) into the containment vent line 101. Step S206 may include providing a discharge point 114 for the containment vent line 101 at a remote location from primary containment 1. The remote location may preferably be outside of the reactor building in a location that is elevated from plant personnel on the ground (such as the roof of the reactor building).

In order to use the containment vent system 100, step 5208 may include opening the containment valves 102a/102b to initially activate the containment vent system 100. It should be understood that this step may occur at an early stage of a serious plant accident in order to allow system 100 to self-regulate in a "passive mode." By placing the system 100 in the "passive mode," plant personnel may be assured that their ability to use key equipment to mitigate the accident may not be challenged. The "passive mode" may also assure plant personnel of the integrity of primary containment 1, without the need for plant personnel to continuously monitor containment pressure, and without the need to station personnel at remote operating stations (to open the CIVs 3a/3b at a later time, for instance). Following the opening of the containment valves 102a/102b, the system 100 may self-regulate by allowing fluid from the wetwell 4 to be vented only after the one or more pressure activated devices 104/108 experience a line pressure exceeding an appropriate set-point pressure. It should also be understood that, in the "passive mode," no external electrical power is required (following initial activation of the system 100 into the "passive mode") in order to operate this passive and self-regulating system 100 (which is particularly advantageous in the event of a serious plant accident).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A containment vent system, comprising:
   a containment vent line in fluid communication with a wetwell vent line of a primary containment of a Boiling Water Reactor (BWR), the containment vent line and the wetwell vent line having different discharge locations and being configured to release fluid from the primary containment;
   one or more containment valves in the containment vent line; and
   one or more pressure activated devices in the containment vent line, located downstream of the one or more containment valves,
   wherein the vent system penetrates the primary containment at only a single location.

2. The containment vent system of claim 1,
   wherein the discharge location of the containment vent line is located in an elevated, remote location from a primary containment boundary of the BWR.

3. The containment vent system of claim 1, wherein the one or more containment valves includes at least one of a ball valve with air-actuator, a butterfly valve with air-actuators, and a butterfly valve with motor-actuator.

4. The containment vent system of claim 1, wherein the one or more pressure activated devices includes a first pressure set-point rupture disk.

5. The containment vent system of claim 4, wherein,
   the one or more pressure activated devices further includes a second pressure set-point rupture disk,
   the second pressure set-point rupture disk being located downstream of the first pressure set-point rupture disk,
   the second pressure set-point rupture disk having a lower set-point pressure than the first pressure set-point rupture disk.

6. The containment vent system of claim 5, further comprising:
   a bypass valve in the containment vent line, the bypass valve providing fluid bypass around the first pressure set-point rupture disk.

7. The containment vent system of claim 6, wherein the containment vent line is configured to cause a combined first fluid flow through the bypass valve and the first pressure set-point rupture disk to be equal to a second fluid flow through the second pressure set-point rupture disk, if the second pressure set-point rupture disk is open and is allowing the second fluid flow to pass through the second pressure set-point rupture disk.

8. The containment vent system of claim 5, further comprising:
   a vent filter in the containment vent line,
   the vent filter being located between the second pressure set-point rupture disk and the first pressure set-point rupture disk,
   the vent filter including a wet filter and chemical additives in the wet filter.

9. The containment vent system of claim 1, further comprising:
   a radiation monitor in the containment vent line, the radiation monitor configured to measure a radiation level of fluid flowing through the containment vent line.

10. The containment vent system of claim 1, further comprising:
    the wetwell vent line connected to the wetwell of the primary containment; and
    an inner and an outer containment isolation valve (CIV) in the wetwell vent line.

11. The containment vent system of claim 10, wherein,
    the one or more containment valves in the containment vent line includes only one containment valve,
    the containment vent line is fluidly connected to the wetwell vent line between the inner and the outer CIVs.

12. The containment vent system of claim 11, wherein the one or more pressure activated devices in the containment vent line includes a first pressure activated device and a second pressure activated device positioned in series within the containment vent line.

13. The containment vent system of claim 12, wherein,
    the first and second pressure activated devices are respective first and second pressure set-point rupture disks,
    the second pressure set-point rupture disk being located downstream of the first pressure set-point rupture disk, the second pressure set-point rupture disk having a lower set-point pressure relative to the first pressure set-point rupture disk.

14. The containment vent system of claim 13, further comprising:
   a bypass line circumventing the first pressure set-point rupture disk within the containment vent line; and
   a bypass valve in the bypass line.

15. The containment vent system of claim 14, further comprising:
   a radiation monitor in the containment vent line, the radiation monitor configured to measure a radiation level of fluid flowing through the containment vent line.

16. The containment vent system of claim 15, wherein the radiation monitor is located downstream of the second pressure set-point rupture disk within the containment vent line.

17. The containment vent system of claim 10, wherein the containment vent line is fluidly connected to the wetwell vent line upstream of both the inner and outer CIVs.

18. The containment vent system of claim 17, wherein the one or more containment valves in the containment vent line includes two containment valves.

19. The containment vent system of claim 1, wherein the containment vent line and the wetwell vent line are in fluid communication at only a single juncture point.

* * * * *